United States Patent
Raschke et al.

(10) Patent No.: US 9,135,392 B2
(45) Date of Patent: Sep. 15, 2015

(54) SEMI-AUTONOMOUS DIGITAL HUMAN POSTURING

(75) Inventors: Ulrich Raschke, Ann Arbor, MI (US); Rishi Tirumali, Ann Arbor, MI (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 676 days.

(21) Appl. No.: 13/459,376

(22) Filed: Apr. 30, 2012

(65) Prior Publication Data

US 2013/0197887 A1 Aug. 1, 2013

Related U.S. Application Data

(60) Provisional application No. 61/593,152, filed on Jan. 31, 2012.

(51) Int. Cl.
*G06T 13/00* (2011.01)
*G06F 17/50* (2006.01)
*G06F 3/01* (2006.01)

(52) U.S. Cl.
CPC ............ *G06F 17/5086* (2013.01); *G06F 3/011* (2013.01); *G06F 17/50* (2013.01); *G06F 2217/06* (2013.01)

(58) Field of Classification Search
None
See application file for complete search history.

(56) References Cited

U.S. PATENT DOCUMENTS

| | | | |
|---|---|---|---|
| 2009/0118863 A1 | 5/2009 | Dariush | |
| 2009/0270170 A1* | 10/2009 | Patton | 463/36 |
| 2009/0326713 A1 | 12/2009 | Moriya | |
| 2010/0228427 A1 | 9/2010 | Anderson et al. | |
| 2011/0175918 A1* | 7/2011 | Liu et al. | 345/473 |
| 2011/0228976 A1* | 9/2011 | Fitzgibbon et al. | 382/103 |
| 2011/0249090 A1* | 10/2011 | Moore et al. | 348/43 |

OTHER PUBLICATIONS

Vahrenkamp et al.Humanoid Motion Planning for Dual-Arm Manipulation and Re-Grasping Tasks, 2009 IEEE/RSJ International Conference on intelligent Robots and System; p. 2464-2470.

J Borenst et al Tele-autonomous Guidance for Mobile Robots 1990 IEEE Transaction on Systems Man & Cybernetics Special Issue Unmanned Systems & Vehicles V 20 No. 6 pp. 1-15.

Peinado et al., "Full-Body Avatar Control with Environment Awareness", IEEE Computer Graphics and Applications, IEEE Aservice Center, New York, NY US, vol. 29, No. 3, May 1, 2009, ISSN: 0272-1716 (14 pages).

Kawaguchi et al., "Database-Driven Grasp Synthesis and Ergonomic Assessment for Handheld Product Design," Digital Human Modeling, Springer Berlin Heidelberg, Berlin, ISBN: 978-3-642-02808-3 (12 pages).

(Continued)

*Primary Examiner* — Kee M Tung
*Assistant Examiner* — Frank Chen (57) ABSTRACT

Product Data Management systems, methods, and mediums. A method includes receiving data representing motion of a human generated by a motion capture device. The method includes identifying a generated posture of the human relative to objects in a virtual environment. The method includes determining whether the generated posture of the human intersects with an object in the virtual environment. Additionally, the method includes responsive to determining that the generated posture intersects with the object by a threshold amount, identifying a posture that will avoid intersection with the object by the threshold amount.

20 Claims, 3 Drawing Sheets

(56) References Cited

OTHER PUBLICATIONS

Yamawaki et al., "Planning Tracking Motion Insusceptible to Unknown Disturbances Using Sensitivity Measure," Robotics and Biomimetics, 2010 IEEE International Conference, Dec. 14, 2010, ISBN 978-1-4244-9319-7 (6 pages).

PCT Search Report dated Apr. 22, 2013, for Appl. No. PCT/US2013/023537 (8 pages).

* cited by examiner

SEMI-AUTONOMOUS DIGITAL HUMAN POSTURING

CROSS-REFERENCE TO RELATED APPLICATION(S) AND CLAIM OF PRIORITY

The present application is related to U.S. Provisional Patent Application No. 61/593,152, filed Jan. 31, 2012, entitled "Semi-Autonomous Digital Human Posturing Method." Provisional Patent Application No. 61/593,152 is assigned to the assignee of the present application and is hereby incorporated by reference into the present application as if fully set forth herein. The present application hereby claims priority under 35 U.S.C. §119(e) to U.S. Provisional Patent Application No. 61/593,152.

TECHNICAL FIELD

The present disclosure is directed, in general, to computer-aided design, visualization, and manufacturing systems ("CAD systems"), product lifecycle management ("PLM") systems, and similar systems, that manage data for products and other items (individually and collectively, product data management systems ("PDM") systems).

BACKGROUND OF THE DISCLOSURE

PDM systems can provide users with helpful and intuitive views of systems, objects, topologies, and other items.

SUMMARY OF THE DISCLOSURE

Various embodiments include PDM systems, methods, and mediums. A method includes receiving data representing motion of a human generated by a motion capture device. The method includes identifying a generated posture of the human relative to objects in a virtual environment. The method includes determining whether the generated posture of the human intersects with an object in the virtual environment. Additionally, the method includes responsive to determining that the generated posture intersects with the object by a threshold amount, identifying a posture that will avoid intersection with the object by the threshold amount.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
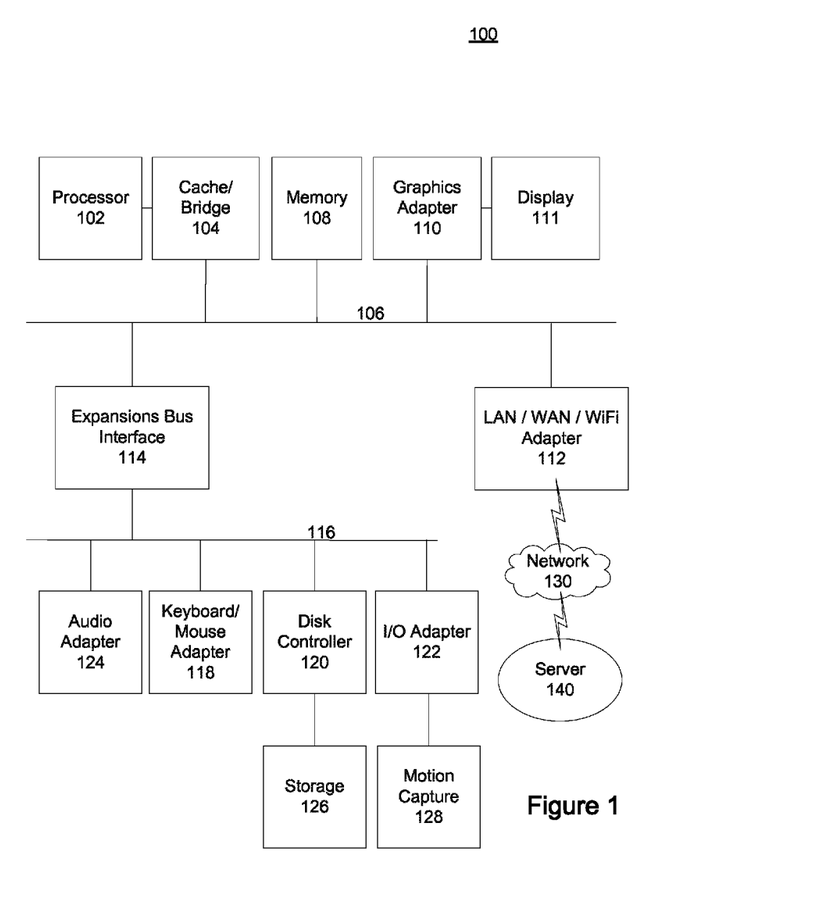
FIG. 1 depicts a block diagram of a data processing system in which an embodiment can be implemented.
Figure 2:
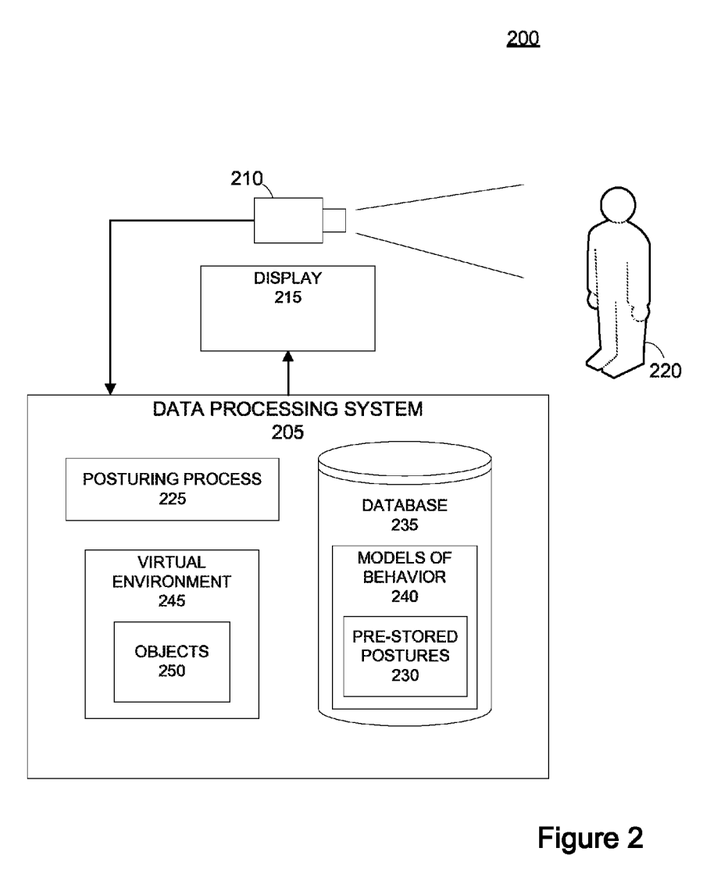
FIG. 2 illustrates a block diagram of a posture management system in accordance with disclosed embodiments.
Figure 3:
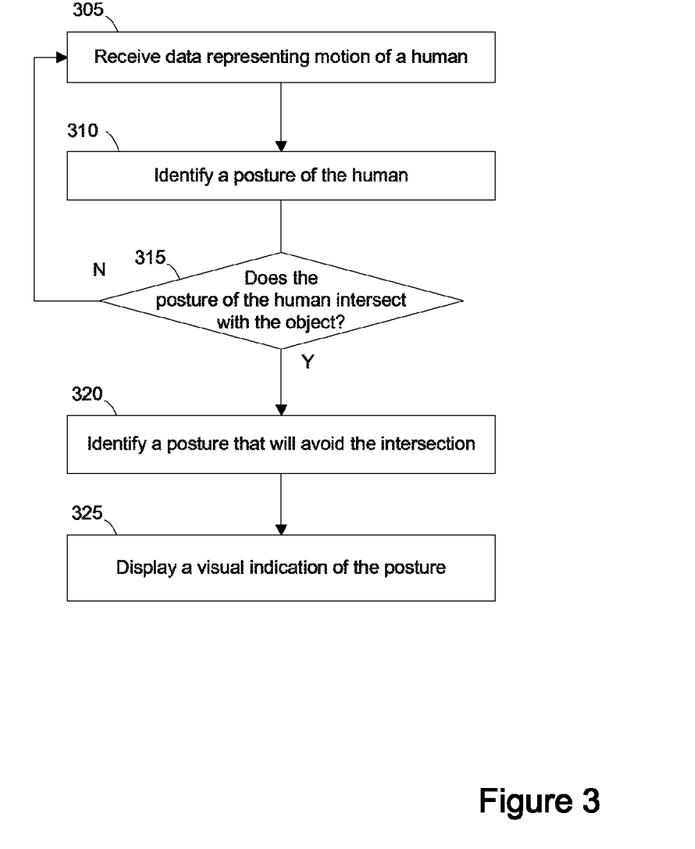
FIG. 3 depicts a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include a system to aid in the rapid and natural posturing of digital human forms that combines motion capture technologies and environment-aware posture prediction processes and algorithms. Disclosed techniques allow simple motion capture devices to be used to posture complex human kinematic forms while maintaining physiologically realistic human postures.

Human figure posturing can be accomplished either by manual manipulation of individual joint or joint chains using inverse kinematics or by using three dimensional motion capture data from motion capture hardware to explicitly set the joint values of the human figure, such as elbow, shoulder, back, hips, etc. Manipulation of human figures in virtual environments can be achieved in a number of different ways. At a simple level, direct manipulation of the individual degrees of freedoms of the individual joints can be used, for example, setting the right shoulder elevation to 45 degrees. However, contemporary human figures have 70+ joints to manipulate, so this approach is tedious and relies on the user's intuition to manipulate the figure into a valid posture. Inverse kinematics can be used to solve the tedium of this problem by allowing easy manipulation of joint chains. For example, a user or system can drag the hand of the figure while using inverse kinematics optimization to solve for a feasible solution of the elbow and shoulder joints. However, inverse kinematics suffers from a number of limitations. Practically, inverse kinematics can result in non-optimal local-minima solutions, while conceptually, evidence suggests that human posture is not determined by any single set of constraint formulations.

Manual manipulation of individual joint angles or joint kinematic chains is time intensive and requires a user's intuition to decide on the desired posture. Whole body posturing using motion capture data requires positional information on many body areas, including feet, knees, pelvis, torso, elbow, wrists, and head to completely define the overall body configuration. This requires sophisticated hardware systems that can capture all of these data and requires that a subject perform the desired motions/poses with their entire body. This can require a dedicated motion-capture lab to capture the motions. Tracking a subset of the bodies and fitting the kinematic chain of the human via optimization approaches often results in non-ideal postures, as the optimization solution may get stuck in local minima. In addition, real-life behaviors such as balance constraints or obstacle avoidance are generally not accounted for.

Disclosed embodiments, described herein, use motion capture devices, including image devices, to capture real-life postures and movements in an efficient and inexpensive manner. Disclosed embodiments combine empirically based posture prediction with motion capture to provide an intuitive and rapid method to posture human figure forms in three dimensional simulation environments. Disclosed systems and methods include a novel combination of motion capture and empirical posture prediction to implement semi-autonomous control of the human figure in the three dimensional environment. The motion capture information can be used to suggest a posture, while the posture prediction process controls the actual posture to respect behavioral and environmental constraints.

FIG. 1 depicts a block diagram of a data processing system 100 in which an embodiment can be implemented, for example as a PDM system particularly configured by software or otherwise to perform the processes as described herein, and in particular as each one of a plurality of interconnected and communicating systems as described herein. The data processing system 100 depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EE-PROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc. I/O adapter 122 can be connected to one or more motion capture devices 128, as described herein.

Various embodiments of the present disclosure can be implemented by a combination of a motion capture device 128 coupled with a human posturing processes executing on one or more data processing systems 100. The motion capture device 128 can be any technology that can provide the three dimensional spatial data of a location on a real moving human, and communicate this information to the system 100. Examples of such hardware include Motion Analysis and Vicon real-time camera-based systems, and the Microsoft KINECT® sensor device.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

FIG. 2 illustrates a block diagram of a posture management system 200 in accordance with disclosed embodiments. The posture management system 200 includes a data processing system 205, a motion capture device 210 and a display 215. The motion capture device 210 tracks movements of a human 220 and records locations of various body parts of the human 220 in three dimensional space as motion capture data. The data processing system 205 receives this motion capture data from the motion capture device 210 for processing.

The data processing system 205 infers one or more postures of the human 220 from the motion capture data. For example, the motion capture data may be sparse indicating only a few points of motions of the body parts of the human 220. The data processing system 205 can improve the accuracy of tracking the human 220 by predicting postures of the human. The data processing system 205 uses the motion capture data from the motion capture device 210 to infer the user-intended posture and apply this inferred posture to the human figure.

The motion capture device 210 could be any device that can provide information on spatially moving a digital human figure. For example, without limitation the motion capture device 210 may be a 2D mouse, a 3D mouse such as a spaceball, or multi-touch interface, a body posture tracking device, such as the Microsoft KINECT® sensor device, Nintendo Wii® controller, multi-touch screen, and/or any other type or any other type device that can provide information regarding a desired posture.

In these illustrative examples, the data processing system 205 includes a posturing process 225 that analyses points of data in the motion capture data to determine the posture of the human 220. In some embodiments, the data processing system 205 can accomplish this posture inference by using hand target locations and using this to drive whole-body posture-prediction methods. In other embodiments, the data processing system 205 uses the posturing process 225 to compare points in the motion capture data with data for the pre-stored postures 230 stored within a database 235 in the data processing system 205. The data processing system 205 may select a posture that most closely matches the motion capture data.

The posturing process 225 may employ a number of methods to accomplish an inference of the user intended target posture. In some embodiments, the data processing system 205 may apply weights to various points of the motion capture data of the human. For example, the data processing system 205 may weight data points representing the hands, arms or legs higher than data points representing the hips or shoulders in inferring the intended posture. In various embodiments, the data processing system 205 uses models of behavior 240 to predict the intended posture. The database 235 may include data representing human movement classified as one or more models of behavior 240. For example, certain actions such as walking, raising an arm, or sitting down may be classified as one or more models of behavior 240. The data processing system 205 may compare points in the motion capture data to determine whether the intended posture is one of the models of behavior 240 stored within the database 235.

As a result of the posture prediction techniques employed by the data processing system 205 and the posturing process 225, the motion capture data from the motion capture device 210 does not need to completely define the desired posture of the digital human figure. Instead, the motion capture data can be sparse, with the data processing system 205 inferring the desired intent of the human 220. Disclosed embodiments can use the motion capture data to suggest a posture to the data processing system 205. The data processing system 205 utilizes behavioral constraints, such as joint range of motion, balance, force exertion, and vision to determine the resulting figure posture. This allows a user to quickly control the figure through gross body postures, which, are then applied to the figure. Thus, disclosed embodiments improve control of the figure by utilizing both the motion capture data and the posture prediction.

Various embodiments of the present disclosure utilize the combination of motion capture data with body posture prediction and take into account obstacles in the environment to realize a semi-autonomous control of the human posture. The data processing system 205 positions the predicted posture within a virtual environment 245. For example, the data processing system 205 may generate a virtual object of the human 220 (e.g., an avatar) having the predicted posture and place this virtual object in the virtual environment 245. The virtual environment 245 may be any type of environment simulated by the data processing system 205. For example, the virtual environment 245 may be an office, warehouse, home, industrial plant, or any other type of simulated environment. The data processing system 205 positions the virtual object of the human 220 in the virtual environment 245.

Once a target posture is defined, the data processing system 205 determines whether the predicted posture of the virtual object contacts or intersects with one or more objects 250 in the virtual environment 245. For example, the data processing system 205 determines whether a collision would occur between the human figure and the surrounding three-dimensional geometry.

In various embodiments, the objective is to avoid the virtual object of the human 220 and the surrounding geometry of the virtual environment 245 occupying the same space. The data processing system 205 determines whether the predicted posture of the virtual object intersects with the object 250 by a threshold amount. In various embodiments contact with the object 250 is permissible, while intersection with the object 250 may not be permissible. For example, a human may be able to place their hand on a table or grasp an object, while the human would not be able to place their hand through the table or object. In various embodiments, the data processing system 205 may generate the threshold amount such that predicted postures where the human 220 would be touching the object 250 is less than the threshold amount of intersection, while predicted postures where the human 220 would penetrate or otherwise occupy the same space as the object 250 results in a determination that the predicted posture intersects with the object 250 by the threshold amount.

Based on this determination, the data processing system 205 determines whether the posture of the human 220 would be possible without colliding or otherwise contacting one or more objects 250 in an actual environment represented by the virtual environment 245. One example can include the analysis of installing a part in the engine compartment of a vehicle. The segments of the human figure form should not penetrate any vehicle chassis or engine components.

If a collision is detected, the data processing system 205 searches for a posture that is similar to the intended posture but avoids the collision. In some embodiments, the data processing system 205 searches for a collision-free posture that is as close as possible to the inferred posture. For example, the data processing system 205 generates a number of different postures that will not collide with the objects 250 in the virtual environment 245. The data processing system 205 may also generate a prediction of an action from the posture information. The data processing system 205 may select the posture based on similarity to the intended posture and achieves the intended action predicted from the posture.

Additionally, in various embodiments, the data processing system 205 may analyze the resulting postures for ergonomic issues. For example, the data processing system 205 may consider physical and bio-mechanical factors in selecting which posture to suggest to the human 220 to avoid the intersection with the object. For example, without limitation, the physical and bio-mechanical factors may include joint range of motion, body part length, balance, force exertion, body strain, and vision. The data processing system 205 uses the physical and bio-mechanical factors to determine whether the suggested posture is possible, practical, and/or ergonomically sound.

Upon selection of the posture, the data processing system 205 can display the selected posture to the human 220 on display 215. In some embodiments, the data processing system 205 generates a transition between the original intended posture of the human 220 inferred by the data processing system 205 and the selected posture. For example, the display

215 may first display the original posture and then display animation for moving from the original posture into the selected posture.

Users of human simulation tools can use the techniques disclosed herein to simulate human task sequences to evaluate human factors issues. To assess the human factors issues, posturing the figure in a way that is representative of how an actual human might accomplish a task may be required for a valid assessment. Using systems and methods as disclosed, users can use simple tracking technologies to track a sparse subset of their own body areas to quickly manipulate the posture of the human figure in their simulation environment. For example, by moving the user's hand forward, the three dimensional position information of their hand would be communicated to the data processing system 205 such that the user's avatar in the three-dimensional environment mirrors this motion. Instead of being concerned with avoiding collisions in the environment or otherwise manipulating the individual body areas of the human figure to maintain physiological realism, the posture prediction methods co-controlling the figure ensure that all of these environmental and behavioral requirements are met. Embodiments of the present disclosure provide a faster positioning proposition for the user than is available today.

The illustration of posture management system 200 in FIG. 2 is intended as an example and not as an architectural limitation for the various embodiments of the present disclosure. Various embodiments can include one or more components, that can be implemented using one or more data processing systems as described herein. These components can include a system to suggest the postural goal of a real human (motion capture), a process to interpret the data of the tracking system to infer the postural goal of the user, a system to identify collisions of a kinematic system (digital human) within a simulation environment, a method to search for a collision free posture of the kinematic system that is as close as possible to the desired goal but still maintains physiological realism, and a method by which a transition between the current and collision free posture is animated in the simulation system.

A preferred embodiment includes a combination of these components. Each of these sub-components can be implemented using a number of different data processing system components and motion capture devices, along with executable instructions for performing processes as described herein.

A combination of the components described above is particularly useful in virtual environments where the environment is not completely known and controlled, in contrast, for example, with video gaming systems where the player has restricted movement in a completely known and controlled environment. In general simulation systems where the environment is totally unknown (or is not completely known), the objective is different.

One objective for human simulation in such an environment is to represent the human posture as accurately as possible for a task, such that assessments of that posture can be performed, such as determining whether the posture is safe. Disclosed embodiments can produce a posture that is as close as possible to that assumed by the real human being tracked by the motion capture device, but while avoiding the objects in the scene.

Thus, a process to search for a collision free posture of the kinematic system that is as close as possible to the desired goal, but still maintains physiological realism, can be important. Disclosed embodiments can implement a behavioral model that describes how someone would posture themselves for a particular situation but includes the ability to avoid collisions with the environment.

Disclosed embodiments are particularly useful for semi-autonomous control of devices in the human simulation space. These techniques can also be used in game technology, where characters are controlled via simple tracking devices but allowed to function in complex environments where collision with surroundings and other players are to be avoided. Currently, the characters in games tend to exist in isolation or are constrained by only simple objects such as walls. Various disclosed embodiments could provide greater posturing fidelity of the characters in cluttered environments, opening up new gaming opportunities. Another embodiment could be used to control humanoid robots, where sensor information from the robot hardware is used in combination with empirical models of the humanoid robot to control the robot motions for gross programming of complex motions, such as, grasping of objects.

FIG. 3 depicts a flowchart of a process in accordance with disclosed embodiments. This process can be performed, for example, by one or more PDM data processing systems configured to perform acts described below, referred to in the singular as "the system." The process can be implemented by executable instructions stored in a non-transitory computer-readable medium that cause one or more PDM data processing systems to perform such a process.

The system receives data representing motion of a human (step 305). "Receiving," as used herein, can include loading from storage, receiving from another device or process, or receiving through an interaction with a user. For example, as part of this step, the system may receive the data from a motion capture device.

The system identifies a posture of the human (step 310). As part of this step, the system may place the identified posture of the human as a virtual object in a virtual environment. For example, the system may predict an intended posture of the human by comparing the data received with a plurality of pre-stored postures. The system may also predict the intended posture by comparing data representing the motion of the human with stored models of behavior and selecting a model of behavior as the intended posture based on one or more weights applied to different positions of body parts of the human in the data representing the motion.

The system determines whether the posture of the human intersects with an object (step 315). As part of this step, the system may determine that the posture of the human would intersect with an object in the virtual environment by a threshold amount. If the posture of the human does not intersect with the object by the threshold amount, the system returns to step 305 to continue to receive and analyze motion capture data.

If the posture of the human intersects with the object by the threshold amount, the system identifies a posture that will avoid the intersection with the object (step 320). As part of this step, the system may generate a prediction of an intended action by the human from the data representing the motion of the human. The system may identify a plurality of postures that will avoid the intersection with the object and then select a posture from the plurality of postures that will avoid the intersection with the object as the identified posture based on the prediction of intended action. The system may also select the posture by determining whether the posture is possible, practical, and/or ergonomically sound for the human based on physical and bio-mechanical factors. The physical and bio-mechanical factors may include a size of various body parts of the human and an amount of strain the human may undergo as a result of placing their body in that posture.

The system displays a visual indication of the posture (step 325). As part of this step, the system may generate an animated transition between the generated posture of the human and the identified posture. The system may output this posture and the animated transition for display on a display device displayed to the human.

The disclosed embodiments decrease the time needed to perform an analysis using a digital human modeling tool. Disclosed embodiments provide distinct technical advantages that can address a fundamental usability bottleneck in digital human modeling, provide the ability to utilize sparse and inaccurate posture data acquired from an external system, provide the ability to posture the whole digital human form in a realistic way employing the concept of inferring user intent from the postural input data, and provide the ability to automatically modify the posture to avoid collisions.

Of course, those of skill in the art will recognize that, unless specifically indicated or required by the sequence of operations, certain steps in the processes described above may be omitted, performed concurrently or sequentially, or performed in a different order.

The following US Patent Publications are incorporated by reference: US 2009/0326713 A1, US 2010/0228427 A1, and US 2009/0118863 A1. "Humanoid Motion Planning for Dual-Arm Manipulation and Re-Grasping Tasks" by Vahrenkamp, et al. (2009 IEEE/RSJ International Conference on Intelligent Robots and Systems) is also incorporated by reference.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a product data management (PDM) data processing system, the method comprising:
   receiving data representing motion of a human generated by a motion capture device;
   identifying a generated posture of the human relative to objects in a virtual environment;
   determining whether the generated posture of the human intersects with an object in the virtual environment; and
   responsive to determining that the generated posture intersects with the object by a threshold amount, identifying a posture that will avoid intersection with the object by the threshold amount,
   wherein identifying the posture that will avoid the intersection with the object comprises:
      generating a prediction of an intended action by the human from the data representing the motion of the human;
      identifying a plurality of postures that will avoid the intersection with the object; and
      selecting a posture from the plurality of postures as the identified posture based on the prediction of the intended action.

2. The method of claim 1, wherein selecting the posture from the plurality of postures as the identified posture comprises:
   determining whether the selected posture is practical for the human based on a physical and bio-mechanical factors.

3. The method of claim 1, wherein identifying the generated posture of the human comprises:
   predicting an intended posture of the human by comparing the data received with a plurality of pre-stored postures.

4. The method of claim 3, wherein predicting the intended posture of the human comprises:
   comparing data representing the motion of the human with stored models of behavior; and
   selecting a model of behavior as the intended posture based on one or more weights applied to different positions of body parts of the human in the data representing the motion.

5. The method of claim 1 further comprising:
   displaying a visual indication of the identified posture.

6. The method of claim 5, wherein displaying the visual indication of the identified posture comprises:
   generating an animated transition between the generated posture of the human and the identified posture; and
   displaying the animated transition.

7. The method of claim 1, wherein the objects in the virtual environment represent objects along a path in a building, the method further comprising:
   identifying a placement for one or more of the objects along the path in the building based on the data representing the motion of the human.

8. A product data management (PDM) data processing system comprising:
   a processor; and
   an accessible memory, the data processing system particularly configured to:
      receive data representing motion of a human generated by a motion capture device;
      identify a generated posture of the human relative to objects in a virtual environment;

determine whether the generated posture of the human intersects with an object in the virtual environment; and identify a posture that will avoid intersection with the object by the threshold amount in response to determining that the generated posture intersects with the object by a threshold amount, wherein to identify the posture that will avoid the intersection with the object, the data processing system is further configured to:

generate a prediction of an intended action by the human from the data representing the motion of the human;

identify a plurality of postures that will avoid the intersection with the object; and select a posture from the plurality of postures as the identified posture based on the prediction of the intended action.

9. The PDM data processing system of claim 8, wherein to select the posture from the plurality of postures as the identified posture, the data processing system is further configured to:

determine whether the selected posture is practical for the human based on physical and bio-mechanical factors.

10. The PDM data processing system of claim 8, wherein to identify the generated posture of the human, the data processing system is further configured to:

predict an intended posture of the human by comparing the data received with a plurality of pre-stored postures.

11. The PDM data processing system of claim 10, wherein to predict the intended posture of the human, the data processing system is further configured to:

compare data representing the motion of the human with stored models of behavior; and select a model of behavior as the intended posture based on one or more weights applied to different positions of body parts of the human in the data representing the motion.

12. The PDM data processing system of claim 8, wherein the data processing system is further configured to:

generate a display of a visual indication of the identified posture.

13. The PDM data processing system of claim 12, wherein to display the visual indication of the identified posture, the data processing system is further configured to:

generate an animated transition between the generated posture of the human and the identified posture; and generate a display of the animated transition.

14. The PDM data processing system of claim 8, wherein the objects in the virtual environment represent objects along a path in a building, and the data processing system is further configured to:

identify a placement for one or more of the objects along the path in the building based on the data representing the motion of the human.

15. A non-transitory computer-readable medium encoded with executable instructions that, when executed, cause one or more product data management (PDM) data processing systems to:

receive data representing motion of a human generated by a motion capture device;

identify a generated posture of the human relative to objects in a virtual environment;

determine whether the generated posture of the human intersects with an object in the virtual environment; and identify a posture that will avoid intersection with the object by the threshold amount in response to determining that the generated posture intersects with the object by the threshold amount, wherein the instructions that cause the PDM data processing system to identify the posture that will avoid the intersection with the object comprise instructions that cause the PDM data processing system to:

generate a prediction of an intended action by the human from the data representing the motion of the human;

identify a plurality of postures that will avoid the intersection with the object; and select a posture from the plurality of postures as the identified posture based on the prediction of the intended action.

16. The computer-readable medium of claim 15, wherein the instructions that cause the PDM data processing system to select the posture from the plurality of postures as the identified posture comprise instructions that cause the PDM data processing system to:

determine whether the posture is practical for the human based on physical and bio-mechanical factors.

17. The computer-readable medium of claim 15, wherein the instructions that cause the PDM data processing system to identify the generated posture of the human comprise instructions that cause the PDM data processing system to:

predict an intended posture of the human by comparing the data received with a plurality of pre-stored postures.

18. The computer-readable medium of claim 17, wherein the instructions that cause the PDM data processing system to predict the intended posture of the human comprise instructions that cause the PDM data processing system to:

compare data representing the motion of the human with stored models of behavior; and select a model of behavior as the intended posture based on one or more weights applied to different positions of body parts of the human in the data representing the motion.

19. The computer-readable medium of claim 15 further comprising instructions that cause the PDM data processing system to:

generate an animated transition between the generated posture of the human and the identified posture; and generate a display of the animated transition.

20. The computer-readable medium of claim 15, further comprising instructions that cause the PDM data processing system to:

generate a display of a visual indication of the identified posture.

* * * * *